United States Patent [19]
Votroubek et al.

[11] 3,921,761
[45] Nov. 25, 1975

[54] METHOD AND MEANS OF WINDING TORSION SPRING

[75] Inventors: Leland C. Votroubek, Cedar Rapids; Duane H. Nelsen, Avoca, both of Iowa

[73] Assignee: Iowa State University Research Foundation, Inc., Ames, Iowa

[22] Filed: Apr. 12, 1974

[21] Appl. No.: 461,023

[52] U.S. Cl. .................. 185/39; 160/191; 160/192
[51] Int. Cl.² ....................... F03G 1/08; E05F 11/00
[58] Field of Search ........... 160/188, 189, 190, 191, 160/192; 185/11, 10, 39, 40; 16/189

[56] References Cited
UNITED STATES PATENTS

| 631,462 | 9/1899 | Hanington | 16/189 |
|---|---|---|---|
| 2,083,467 | 6/1937 | Morris | 160/191 |
| 2,630,597 | 3/1953 | Robinson | 160/191 |

FOREIGN PATENTS OR APPLICATIONS

| 475,597 | 7/1951 | Canada | 160/189 |

Primary Examiner—Philip C. Kannan
Attorney, Agent, or Firm—Zarley, McKee, Thomte & Voorhees

[57] ABSTRACT

The torsion spring winding device of the present invention comprises a gear having annular teeth thereon and additionally having means for detachably securing the gear to the free end of a torsion spring. A worm gear support is rotatably mounted to the gear so as to permit the gear to rotate independently of the worm gear support. The worm gear support carries an elongated worm gear in driving engagement with the annular teeth of the gear, and additionally includes a stop means for engaging the wall upon which the torsion spring is mounted.

The method of the present invention comprises attaching a rotatable gear member having a plurality of peripheral teeth thereon to the free end of a torsion spring, engaging the peripheral teeth of the gear member with a worm gear, holding the worm gear mechanism against swinging movement with respect to the spring whereby the worm gear prevents rotation of the gear member and the free end of the spring with respect to the fixed end of the spring, rotating the worm gear to drive the gear member in a rotational direction whereby the free end of the torsion spring is rotated with respect to the fixed end thereof, and detaching and removing the gear member from the spring.

11 Claims, 5 Drawing Figures

U.S. Patent   Nov. 25, 1975   3,921,761
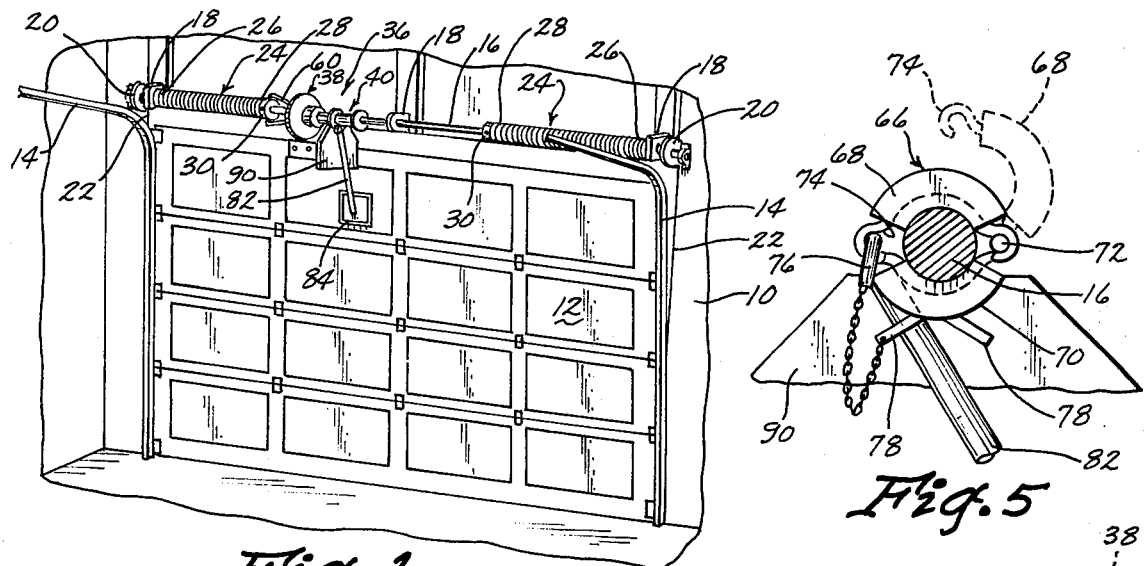
Fig. 1
Fig. 5
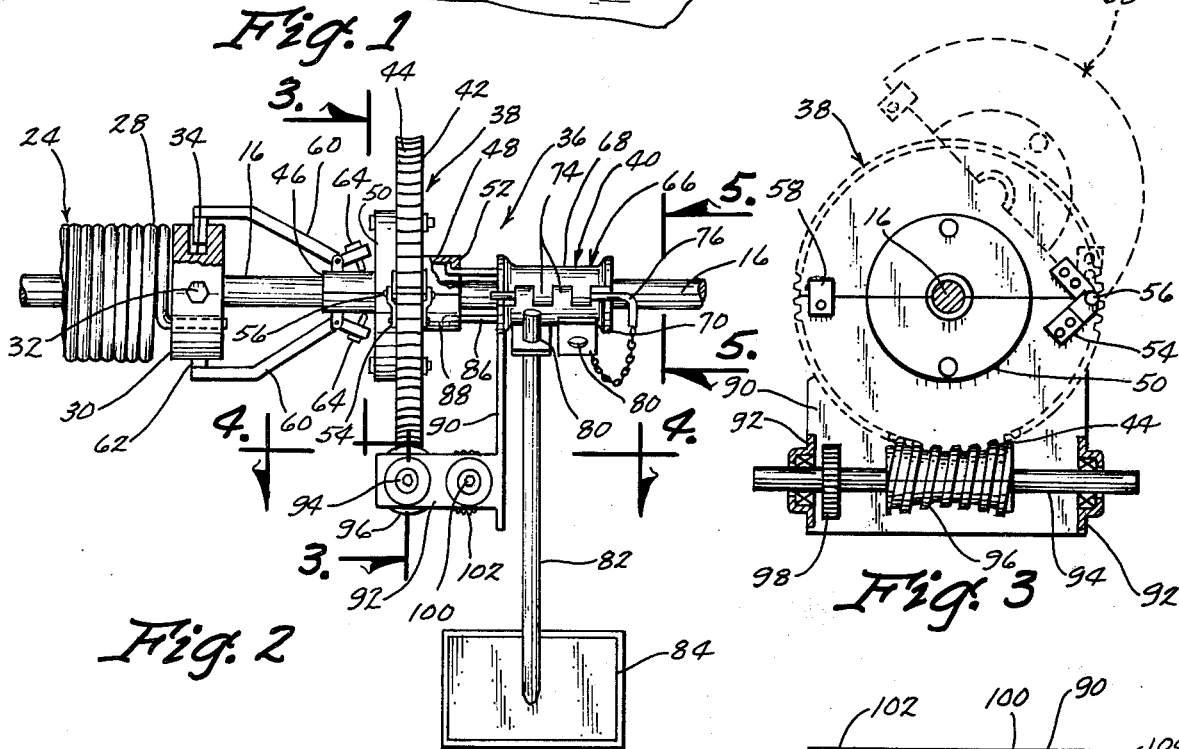
Fig. 2
Fig. 3
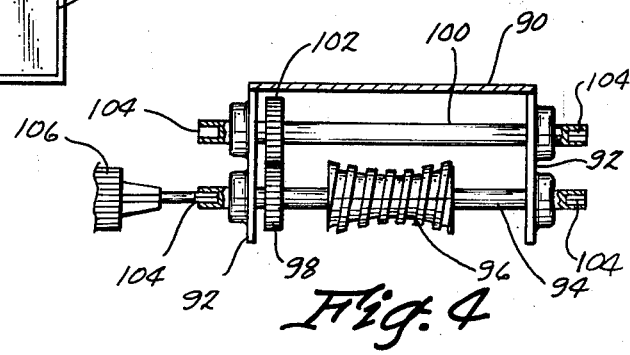
Fig. 4

METHOD AND MEANS OF WINDING TORSION SPRING

BACKGROUND OF THE INVENTION

The present invention relates to torsion springs and particularly to torsion springs used in conjunction with folding garage doors.

Many garage door structures presently utilize torsion springs for counter balancing the weight of the garage door so as to facilitate the lifting of the garage door. The torsion springs tend to neutralize the weight of the door so that it may be raised and lowered with ease.

During the installation of the garage door, these torsion springs must be twisted until they provide the desired torque. Presently these springs are wound by inserting rods into plugs at the free end of the torsion spring and by twisting the free end with respect to the fixed end of the torsion spring. When the desired number of turns have been administered to the spring, the free end of the torsion spring is secured to the mechanism for counter balancing the garage door. Because of the tremendous torque exerted by the torsion spring during winding, the danger always exists that the person installing the spring will lose his grip on the rods which are being used to wind the spring. In such a situation the release of the spring can result in serious injury to the installer, and this injury is often times inflicted by the rods which are used to twist the spring. Furthermore, while the rods permit the application of leverage, they are not a highly efficient means for twisting the spring.

The present invention contemplates the utilization of a gear member which is attached to the free end of the spring, and which is driven by a worm gear. The worm gear prevents the flyback of the torsion spring, and furthermore permits the application of great leverage during the winding operation. Prevention of flyback of the torsion spring is particularly important, and this feature results from the fact that the worm gear cannot be driven by the main gear member.

Therefore, a primary objective of the present invention is the provision of a device which permits winding or unwinding of the torsion spring in a safe and efficient manner.

A further object of the present invention is the provision of a device which holds the spring against unwinding after torque develops during the winding process.

A further object of the present invention is the provision of a device which permits application of strong leverage during the winding process.

A further object of the present invention is the provision of a device which permits the use of an electric drill or other hand power tool for winding the spring.

A further object of the present invention is the provision of a device which can be used with any presently existing garage door torsion spring.

A further object of the present invention is the provision of a device which is detachable from the torsion spring after the spring has been wound the desired number of turns.

A further object of the present invention is the provision of a device which is economical to manufacture, durable in use, and efficient in operation.

This invention consists in the construction, arrangements and combination of the various parts of the device, whereby the objects contemplated are attained as hereinafter more fully set forth, specifically pointed out in the claims, and illustrated in the accompanying drawings in which:

FIG. 1 is a pictorial view of the present invention mounted on a torsion spring for a conventional garage door.

FIG. 2 is a plan view of the present invention.

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 2.

DESCRIPTION OF THE DRAWINGS.

Referring to FIG. 1, a garage wall 10 is shown having a garage door 12 mounted thereon. Door 12 is conventional for folding garage doors, and is mounted upon a pair of tracks 14 for movement between closed and open positions in conventional fashion.

Mounted above door 12 is a torsion spring shaft 16 which is rotatably journaled in three brackets 18 which are mounted to wall 10. On the opposite ends of shaft 16 are a pair of drums 20. Wound around each drum 20 is a cable 22 having its lower end connected to door 12. Thus by rotating shaft 16 it is possible to wind cables 22 upwardly, thereby lifting door 12.

Surrounding shaft 16 adjacent the opposite ends thereof, are two cylindrical torsion springs 24. Each torsion spring 24 has a fixed end 26 attached to bracket 18 and a free end 28 which is free to rotate with respect to fixed end 26. Attached to free end 28 is a cylindrical member 30 having a set screw 32 therein which is adapted to be screwed down against shaft 16 so as to secure free end 28 of torsion spring 24 to shaft 16. Cylindrical member 30 also has a plurality of apertures 34 which are adapted to receive conventional levers (not shown) for winding torsion spring 24. All of the above described structure is conventional for presently known garage doors having torsion spring counter balance mechanisms.

The numeral 36 generally refers to a device for winding torsion spring 24. Device 36 comprises a rotatable member 38 and a stationary member 40. Rotatable member 38 includes a gear 42 having a plurality of teeth 44 around the periphery thereof. Gear 42 includes a pair of cylindrical collars 46, 48 extending outwardly from the opposite sides thereof. Also, a reinforcing plate 50 is operatively secured to one surface of gear 42. Plate 50 could also be cast as part of gear 42. Collar 48 includes a radially inwardly extending flange 52.

Referring to FIG. 3, rotatable member 38 is divided into two halves which are hinged by hinge 54 for swinging movement about pivotal axis 56 which extends parallel to shaft 16. Swinging movement about axis 56 permits the halves of rotatable member 38 to be spread so that they may be mounted upon shaft 16 and closed there around. A lock 58 is provided for locking the halves together after they have been mounted on shaft 16.

Pivotally mounted to the outer surface of collar 46 are a pair of tongs 60 having inwardly protruding fingers 62 which are adapted to be fitted within apertures 34 at free end 28 of torsion spring 24. A pair of adjusting bolts 64 threadably extend through the ends of tongs 60 opposite from fingers 62. Tightening down of bolts 64 causes fingers 62 to be moved inwardly into apertures 34 so as to lock rotatable member 38 to free end 28 of torsion spring 24.

Stationary member 40 includes a cylindrical collar portion 66 which is comprised of upper and lower halve sections 68, 70. Halve sections 68, 70 are hinged together by pin 72. The opposite ends of halves 68, 70 include interlocking eyes 74 through which a locking pin 76 may be inserted. Two angularly extending ears 78 extend downwardly from lower half sections 70, and include holes 80 therein. Slidably extending through one hole 80 is a stop arm 82 having a foot 84 therein for engaging garage door 12 or wall 10. Ears 78 with holes 80 therein are angled in opposite directions with respect to one another so that the device can be reversed when it is used to wind the remaining spring 24 at the opposite end of shaft 16. Extending from one end of collar portion 66 is a cylindrical flange 86 having a flared end 88. Flared end 88 is adapted to be received within flanges 52 of rotatable member 38 so as to couple stationary member 40 to rotatable member 38 while at the same time permitting rotatable member 38 to rotate with respect to stationary member 40.

Extending downwardly from collar portion 66 of stationary member 40 is a support plate 90 having on its lower end a pair of spaced apart and parallel plates 92. Rotatably journaled between plates 92 is a worm gear shaft 94 having a worm gear 96 rigidly mounted thereon. Also mounted on worm gear shaft 94 is a spur gear 98. Rotatably journaled between plates 92 is a second shaft 100 having a spur gear 102 thereon. Spur gears 98, 102 intermesh. The opposite ends of shafts 94, 100 each include a receptacle 104 which is adapted to receive an Allen type wrench or any other conventional device which may be mounted in the chuck of a conventional power drill such as illustrated by the numeral 106 in FIG. 4. Worm gear 96 may be driven in a first rotational direction by inserting the chuck in receptacle 104 of shaft 94. If it is desired to reverse the direction of worm gear 96 the operator places the driving tool in receptacle 104 of shaft 100. Because of the intermeshing of gears 98, 102 the driving of shaft 100 causes worm gear 96 to be driven in a reverse direction.

In operation, the operator assembles the garage door and spring assemblies prior to the winding of spring 24. Then collar portion 66 is opened to position shown by shadow lines in FIG. 5 and then is closed around torsion spring shaft 16. Lock pin 76 is then inserted through eye 74 so as to lock collar portion 66 in position around shaft 16. It should be noted that collar 66 is slidably mounted upon torsion spring shaft 16 so that it is free for longitudinal movement thereon.

Rotatable member 38 is then placed around the shaft 16 in the same manner as was done with stationary member 40. Referring to FIG. 3, rotatable member 38 is shown in its open position by shadow lines and in its closed position by solid lines. When member 38 is moved to its closed position, flanges 52 thereof are enclosed in overlapping relationship around flared ends 88 of cylindrical portion 86 of stationary member 40. Not only is rotatable member 38 longitudinally slidable on shaft 16, but it is also longitudinally slidable on cylindrical collar 86 of stationary member 40.

Next the adjusting bolts 64 are tightened down to bring fingers 62 of tongs 60 into apertures 34 of cylindrical member 30 at the end of spring 24.

Before beginning the winding operation, stationary member 40 is moved into position with worm gear 96 in engagement with teeth of gear 42. The ability of flanges 52 to slide upon cylindrical portion 86 of stationary member 40 permits the relative movement between gear 42 and stationary member 40. Stop arm 82 is then placed within the opening 80 of one of ears 78 so that foot 84 engages garage door 12, wall 10, or any other stationary structure upon which spring 24 happens to be mounted.

The operator then inserts a power tool into receptacle 104 of shaft 94 as is illustrated in FIG. 4. Rotation of worm gear 96 causes rotation of gear 42 and consequently causes twisting of free end 28 of spring 24 with respect to fixed end 26 thereof. Worm gear 96 prevents unwinding of spring shaft 24 while at the same time permitting the application of a significant mechanical advantage during the winding of the spring. Foot 84 prevents stationary member 40 from rotating on shaft 16, but gear 42 is free to rotate thereon in response to driving action of worm gear 96. As the spring winds, its length becomes shortened. The slidable mounting of gear 42 and stationary member 40 on shaft 16 permits these two members to slide along shaft 16 to compensate for the shortening of the spring. Furthermore, the slidable mounting of flanges 52 on cylindrical portion 86 permit further compensation between rotatable member 38 and stationary member 40. As can be seen in FIG. 2, teeth 44 of gear 42 have a slightly concave configuration so as to receive worm gear 96. This concave configuration prevents worm gear 96 from sliding out of engagement with gear 42.

While a single gear 42 is shown in the drawings, it would be possible to use a system of intermeshing gears driven by worm gear 96 instead of a single gear. Furthermore, it is possible to use an electric drill or other power hand tool to drive worm gear 96. A hand crank would also work satisfactorily.

The device of the present invention may also be used to unwind a torsion spring in a controlled manner. For example, when one spring breaks on a double spring door, the remaining spring must be unwound before replacing the broken one. Such unwinding by present methods is equally as dangerous as winding, but the present invention alleviates this danger.

While the spur gear system 102, 98 is shown, it would be possible to replace the system by attaching a reversible motor permanently to shaft 94 so as to drive worm gear 96. This system would eliminate shaft 100, and spur gears 98, 102, thereby providing a more compact device.

Thus it can be seen that the device accomplishes at least all of its stated objectives.

I claim:

1. In combination:
    stationary support means;
    a torsion spring having first and second ends, said first end being fixed to said support means and said second end being yieldably twistable with respect to said first end about a first axis;
    gear means comprising at least one rotatable gear member having a plurality of annular teeth thereon;
    an elongated worm gear drivingly engaging said annular teeth of said one gear member whereby rotation of said worm gear about its longitudinal axis causes rotation of said one gear member;

coupling means coupling said worm gear to said one gear member to hold said worm gear in driving engagement with said teeth;

stop means associated with said worm gear for engaging said support means to hold said worm gear against swinging movement in at least one direction about said first axis of said torsion spring;

grasping means on said gear means for detachably rententively engaging said second end of said torsion spring, said grasping means being drivingly connected to said one gear member whereby rotation of said worm gear about its longitudinal axis causes rotation of said one gear member, said grasping means and said second end of said torsion spring;

said worm gear having means thereon for connection to a rotational prime mover for rotating said worm gear about its longitudinal axis, said worm gear being rotatably mounted to a worm gear support means, said coupling means rotatably coupling said worm gear support means to said one gear member whereby said one gear member is free to rotate about said first axis independently from said worm gear.

2. The combination of claim 1 wherein said stationary support means includes a shaft extending along said first axis and a support wall lying in a plane spaced from said shaft, said one gear member surrounding and being rotatable upon said shaft, said stop means engaging said support wall.

3. The combination according to claim 2 wherein said one gear member comprises two portions hinged together about a hinge axis parallel to and spaced from said first axis whereby said two portions are swingable about said hinge axis to separate and permit removal of said one gear from around said shaft, lock means being on said one gear member for locking said two portions together in closed relationship around said shaft.

4. The combination according to claim 3 wherein said coupling means comprises a pair of rotatably interlocked annular flanges, one of said flanges being on said gear means and the other of said flanges being on said worm gear support, said flanges surrounding said shaft.

5. The combination according to claim 4 wherein each of said annular flanges comprise two half members hinged together and movable from a closed position wherein they surround said shaft to an open position wherein they are free for removal from said shaft.

6. The combination according to claim 3 wherein said wall comprises a garage door mounted on a track for upward and downward movement; said shaft having a drum thereon, an elongated flexible member being wound around said drum and having one end attached to said door; said shaft being rotatable with respect to said first end of said torsion spring, means being on said second end of said torsion spring for securing said second end of said torsion spring to said shaft.

7. In combination, a stationary support means including a shaft;

a torsion spring embracing said shaft and having a first end fixed to said support means and a second end yieldably twistable with respect to said first end about a first axis which is parallel to the longitudinal axis of said shaft;

a rotatable gear member rotatably mounted on said shaft and having a plurality of annular teeth thereon, a worm gear support means rotatably secured to said shaft and having an elongated worm gear secured thereto which drivingly engages said annular teeth of said gear member whereby rotation of said worm gear about its longitudinal axis causes rotation of said gear member; coupling means coupling said worm gear to said gear member to hold said worm gear in driving engagement with said teeth, stop means associated with said worm gear for engaging said support means to hold said worm gear against swinging movement in at least one direction about said first axis of said torsion spring;

grasping means on said gear means for detachably retentively engaging said second end of said torsion spring, said grasping means being drivingly connected to said gear member whereby rotation of said worm gear about its longitudinal axis causes rotation of said gear member, said grasping means and said second end of said torsion spring;

said worm gear having means thereon for connection to a rotational prime mover for rotating said worm gear about its longitudinal axis.

8. The combination of claim 7 wherein said gear member comprises a pair of gear member portions which are hinged together to permit the selective mounting and removal of said gear member on said shaft, said worm gear support means also being removably mounted on said shaft.

9. The combination of claim 7 wherein said torsion spring is of elongated cylindrical configuration, said shaft mounted to a wall in spaced and parallel relationship thereto, said shaft extending outwardly from said second end of said spring, said worm gear support having a portion surrounding and being rotatable on said shaft, said stop means engaging said wall to hold said worm gear support against rotation on said shaft.

10. A method for winding a torsion spring, said torsion spring having a free end and a fixed end, said fixed end being anchored to a support means, a shaft being mounted to said support means and extending through said spring; said method comprising:

attaching a rotatable gear member having a plurality of peripheral teeth thereon to said free end of said torsion spring;

engaging said peripheral teeth of said gear member with a worm gear;

holding said worm gear against swinging movement with respect to said spring whereby said worm gear prevents rotation of said gear member and said free end of said spring with respect to said fixed end of said spring.

rotating said worm gear to drive said gear member in a rotational direction whereby said free end of said torsion spring is rotated with respect to said fixed end;

securing said free end of said spring to said shaft; and detaching and removing said gear member from said spring.

11. A method according to claim 10 comprising rotatably mounting said gear member on said shaft and removing said gear member from said shaft after said free end of spring is secured to said shaft.

* * * * *